March 31, 1964 K. EKLUND 3,127,212
WHEELS FOR VEHICLES RUNNING ON RAIL TRACKS
Filed Feb. 14, 1962
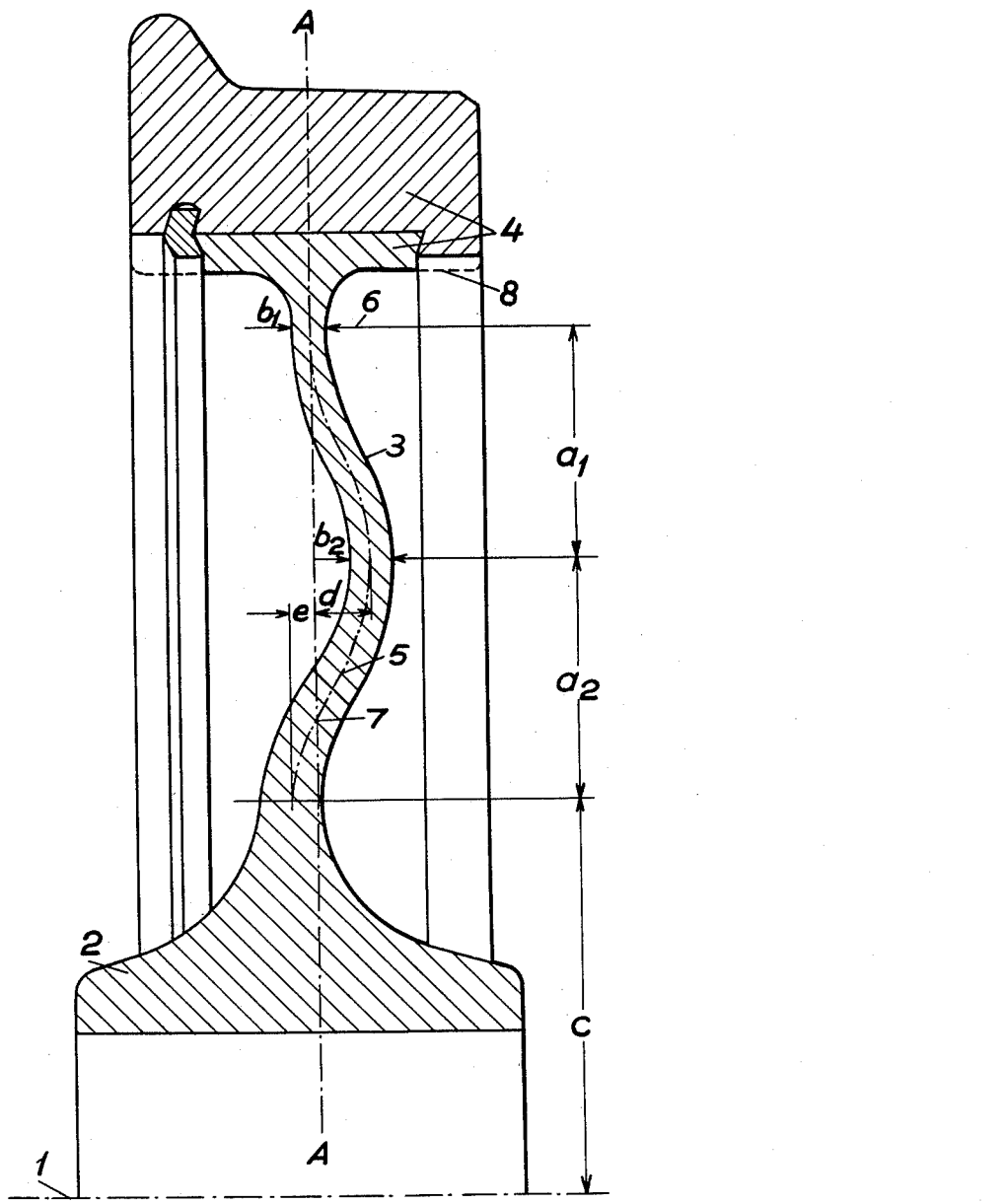
INVENTOR.
Knut Eklund
BY
Bailey, Stephens & Huettig
ATTORNEYS

United States Patent Office 3,127,212
Patented Mar. 31, 1964

3,127,212
WHEELS FOR VEHICLES RUNNING ON
RAIL TRACKS
Knut Eklund, Surahammar, Sweden, assignor to Allmänna
Svenska Elektriska Aktiebolaget, Vasteras, Sweden, a
Swedish corporation
Filed Feb. 14, 1962, Ser. No. 173,290
Claims priority, application Sweden Feb. 17, 1961
7 Claims. (Cl. 295—21)

The present invention relates to a wheel for vehicles running on rail tracks, comprising a hub part, a waved disc part surrounding said hub part and a rim surrounding said disc part. The ring may be provided with a surrounding shrunk-on tyre or it may be formed to act as tyre itself.

For known types of wheels for railway use it is common that they are subject to deformations during braking, causing considerable heating of the rim part, so that when the wheel has cooled great axial deformations (track alterations) remain because the temperature in the rim increases very quickly being lower at the inner part of the wheel, whereby the rim endeavours to expand. As the yield limit of a material falls at increasing temperature, the rim can stretch the disc part of the wheel only to a certain degree and the material in the rim flows until an equilibrium is obtained, that is, the rim gets upset. When the braking has stopped and the wheels have obtained normal temperature, the outer diameter of the wheel has diminished whereby the rim squeezes the disc part which is bent sideways out over its attachment at the hub. Both the wheels in a wheel set are bent sideways whereby the deformations may cause a track alteration of about 15–20 mm. which brings about great risks of derailment and great costs for taking the wheel set out of service.

One object of the wheel according to the invention is to provide such a form on the wheel that elastic as well as remaining axial deformations are brought down to values which can be accepted by the railway administrators, with new wheels as well as when the wheel tyre has been turned down to the limit of refusal. Even after repeated heating the final values must not exceed acceptable limits.

This is obtained according to the invention through a certain way of constructing the wheel. The wheel should have the general form of a solid of revolution, i.e., it should have similar axial sections. Further the hub, disc and rim should be made of one piece of material since welding joints or other joints have a decisive influence on the elastic characteristics of the wheel so that the object of the invention cannot usually be obtained in a wheel composed of several different parts which are for instance welded together. According to the invention the disc part of the wheel is formed so that in an axial section of the centre line of the disc extends a substantial distance to both sides of a plane standing at right angles to the axis of rotation of the wheel and passing through the centre of the disc part at a point where the disc part leaves the rim, and the distance between said centre line and said plane is greater at a point between the hub and rim than at the hub. If the said centre line of the disc part has only one intersectional point with said plane between the hub and rim, a simple embodiment of the invention is obtained which is easy to manufacture. The deformations of the wheel during and after heating will be most favourable if the said centre line of the disc part at the point which is furthest away from said plane extends away from the opposite rail of the track.

The accompanying drawing shows in axial section one-half of a wheel according to the invention. In the figure, 1 designates the axis of rotation of the wheel, 2 the hub part, 3 the disc part and 4 the rim. The line 5 is the centre line of the disc part and the horizontal line 6 shows the attachment of the disc part to the rim. The plane A—A at right angles to the axis of rotation runs through the centre line 5 at the attachment 6 and inside this point the centre line has only one intersectional point 7 with the plane A—A. As can be seen from the drawing, the centre line extends a substantial distance to both sides of the plane A—A and the distance between this line and the plane is greater at a point between the hub and rim than at the hub. The radii of curvature are throughout rather great and the intersectional point 7 between the plane A—A and the centre line is situated nearer the hub than the rim. The wheel shown in the drawing is a one piece wheel with a separate, shrunk-on tyre 9. However, the invention can as well be used with wheels made in one piece and then the inner side of the rim usually has the form indicated in dotted lines at 8. In order to find the details of the usually most favourable form of a wheel according to the invention the following formula may be used:

$$0.80 \leq \frac{d}{e+d} \cdot \frac{1-\left(\frac{c}{c+a_2}\right)^2}{1-\left(\frac{c+a_2}{c+a_2+a_1}\right)^2} \cdot \frac{a_2}{a_1+a_2} \cdot \frac{c+a_2+a_1}{c+a_2} \cdot \left(\frac{h_2}{h_1}\right)^3 .$$

$$\frac{\dfrac{1-\left(\frac{c+a_2}{c+a_2+a_1}\right)^2}{1+\mu} - \dfrac{2 \cdot \left(\frac{c+a_2}{c+a_2+a_1}\right)^2 \cdot \ln\left(\frac{c+a_2}{c+a_2+a_1}\right)}{1-\mu}}{\dfrac{1-\left(\frac{c}{c+a_2}\right)}{1+\mu} - \dfrac{2 \cdot \left(\frac{c}{c+a_2}\right) \cdot \ln\left(\frac{c}{c+a_2}\right)}{1-\mu}} \leq 1.30$$

where the symbols used indicate as follows:

$a_1$ the distance parallel to said plane (A—A) from the attachment between disc part and rim to the point where the disc part extends furthest away from said plane.

$a_2$ in the same way the distance from said point to the attachment between disc part and hub.

$c$ in the same way the distance from said last mentioned point to the axis of rotation of the wheel.

$b_1$ the thickness of the disc part at its attachment to the rim.

$b_2$ the thickness of the disc part at the point furthest away from said plane (A—A).

$h_1$ the average thickness of the disc part within the range of $a_1$.

$h_2$ the average thickness of the disc part within the range of $a_2$.

$d$ the greatest distance between said plane and the centre line of the disc part.

$e$ the distance between said plane and the centre line at the attachment between disc part and hub.

$\mu$ the contraction index of the material used.

I claim:

1. A wheel for vehicles running on rail tracks comprising one integral piece of material comprising a hub part, a wave formed disc part surrounding said hub part and a rim surrounding said disc part, the said wheel forming a body with similar axial sections, the centre line of said disc part extending a substantial distance to both sides of a plane at right angles to the axis of rotation of the wheel and passing through the centre of the disc part at the point where said disc part leaves said rim, the distance between said centre line and said plane being greater at a point between the said hub and rim than at the hub.

2. A wheel for vehicles running on rail tracks comprising one integral piece of material comprising a hub part, a wave formed disc part surrounding said hub part and a rim surrounding said disc part, the said wheel forming a body with similar axial sections, the centre line of said disc part at a point nearest to the rim running substantially at right angles to the axis of rotation of the wheel, the said centre line also running on both sides of a plane at right angles to the said axis and passing through said point, the distance between said centre line and said plane being greater at a point between the said hub and rim than at the hub.

3. A wheel as claimed in claim 2, having a shrunk-on tire surrounding said rim.

4. A wheel as claimed in claim 1 having a shrunk-on tire surrounding said rim.

5. A wheel as claimed in claim 1 in which said center line has only one point of intersection with said plane between said hub and rim.

6. A wheel as claimed in claim 5 in which said point of intersection is located nearer to said hub part than to said rim.

7. A wheel as claimed in claim 5 in which $$0.80 \leq \frac{d}{e+d} \cdot \frac{1-\left(\frac{c}{c+a_2}\right)^2}{1-\left(\frac{c+a_2}{c+a_2+a_1}\right)^2} \cdot \frac{a_2}{a_1+a_2} \cdot \frac{c+a_2+a_1}{c+a_2} \cdot \left(\frac{h_2}{h_1}\right)^3 \cdot$$

$$\frac{\frac{1-\left(\frac{c+a_2}{c+a_2+a_1}\right)^2}{1+\lambda} - \frac{2 \cdot \left(\frac{c+a_2}{c+a_2+a_1}\right)^2 \cdot \ln\left(\frac{c+a_2}{c+a_2+a_1}\right)}{1-\lambda}}{\frac{1-\left(\frac{c}{c+a_2}\right)}{1+\lambda} - \frac{2 \cdot \left(\frac{c}{c+a_2}\right) \cdot \ln\left(\frac{c}{c+a_2}\right)}{1-\lambda}} \leq 1.30$$

wherein the symbols used indicate as follows:

$a_1$ the distance parallel to said plane (A—A) from the attachment between disc part and rim to the point where the disc part extends furthest away from said plane;

$a_2$ in the same way the distance from said point to the attachment between disc part and hub;

$c$ in the same way the distance from said last mentioned point to the axis of rotation of the wheel;

$b_1$ the thickness of the disc part at its attachment to the rim;

$b_2$ the thickness of the disc part at the point furthest away from said plane (A—A);

$h_1$ the average thickness of the disc part within the range of $a_1$;

$h_2$ the average thickness of the disc part within the range of $a_2$;

$d$ the greatest distance between said plane and the center line of the disc part;

$e$ the distance between said plane and the center line at the attachment between disc part and hub;

$\lambda$ the contraction index of the material used.

References Cited in the file of this patent

FOREIGN PATENTS

| | | |
|---|---|---|
| 412,461 | Italy | Dec. 19, 1945 |
| 559,919 | Belgium | Aug. 31, 1957 |
| 608,627 | Great Britain | Sept. 17, 1948 |